United States Patent
Vora et al.

(10) Patent No.: US 11,914,378 B2
(45) Date of Patent: Feb. 27, 2024

(54) INTERSECTION NODE-ASSISTED HIGH-DEFINITION MAPPING

(71) Applicant: Ford Global Technologies, LLC, Dearborn, MI (US)

(72) Inventors: Ankit Vora, Northville, MI (US); Siddharth Agarwal, Ann Arbor, MI (US); Krishanth Krishnan, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 53 days.

(21) Appl. No.: 17/323,842

(22) Filed: May 18, 2021

(65) Prior Publication Data
US 2022/0374016 A1    Nov. 24, 2022

(51) Int. Cl.
*G05D 1/02* (2020.01)
*G01C 21/00* (2006.01)
*G05D 1/00* (2006.01)

(52) U.S. Cl.
CPC ....... *G05D 1/0212* (2013.01); *G01C 21/3815* (2020.08); *G01C 21/3841* (2020.08);
(Continued)

(58) Field of Classification Search
CPC .... G05D 1/0212; G05D 1/0231; G05D 1/027; G05D 1/0276; G05D 1/0278; G01C 21/3841; G01C 21/3815
See application file for complete search history.

(56) References Cited

U.S. PATENT DOCUMENTS 10,248,124 B2    4/2019  Bellaiche
2008/0195316 A1*   8/2008  Krishnaswamy .... G05D 1/0253
                                              348/E5.066
(Continued)

FOREIGN PATENT DOCUMENTS

CN   108956145 A  * 12/2018  .......... G01M 13/045
WO   2017079460 A2    5/2017

OTHER PUBLICATIONS

Du, Rolling Bearing Fault Diagnosis Method Based on Nondestructive-Constraint Noise Reduction Sparse Self-Encoding (Year: 2018).*
(Continued)

*Primary Examiner* — Kenneth J Malkowski
*Assistant Examiner* — Carville Albert Hollingsworth, IV
(74) *Attorney, Agent, or Firm* — Brandon Hicks; Eversheds Sutherland (US) LLP (57) ABSTRACT

A computer-implemented method for controlling a vehicle includes receiving, via a processor, from two or more IX control devices disposed at a two or more stationary positions having known latitudes longitudes and orientations, first sensory data identifying the position and dimensions of a feature in a mapped region. The processor generates a plurality of IX nodes based on the first sensory data received from the IX control devices, and receives LiDAR point cloud that includes LiDAR and other vehicle sensory device data such as Inertial Measurement Unit (IMU) data received from a Vehicle (AV) driving in the mapped region. The LiDAR point cloud includes a simultaneous localization and mapping (SLAM) map having second dimension information and second position information associated with the feature in the mapped region. The processor generates, without GPS and/or real-time kinematics information, an optimized High-Definition (HD) map having Absolute accuracy using batch optimization and map smoothing.

17 Claims, 6 Drawing Sheets

(52) U.S. Cl.
CPC ........... *G05D 1/027* (2013.01); *G05D 1/0231* (2013.01); *G05D 1/0276* (2013.01); *G05D 1/0278* (2013.01)

(56) References Cited

U.S. PATENT DOCUMENTS

| | | | |
|---|---|---|---|
| 2013/0290223 A1* | 10/2013 | Chapelle | G06N 20/00 706/12 |
| 2018/0329433 A1* | 11/2018 | Zhao | G05D 1/0094 |
| 2018/0361929 A1* | 12/2018 | Zhang | B60D 1/366 |
| 2020/0111358 A1* | 4/2020 | Parchami | G08G 1/056 |
| 2020/0191970 A1* | 6/2020 | Hou | G06V 10/82 |
| 2020/0209886 A1* | 7/2020 | Lee | G01S 17/931 |
| 2021/0122364 A1* | 4/2021 | Lee | G06K 9/627 |
| 2021/0286923 A1* | 9/2021 | Kristensen | G06F 30/27 |
| 2022/0335819 A1* | 10/2022 | Heinla | G08G 1/0145 |
| 2022/0373685 A1* | 11/2022 | Dold | G06T 7/60 |

OTHER PUBLICATIONS

Translation of CN108956145A1 (Year: 2018).*
C. Baduea et al. "Self-Driving Cars: A Survey" (Oct. 2019).

* cited by examiner

INTERSECTION NODE-ASSISTED HIGH-DEFINITION MAPPING

TECHNICAL FIELD

The present disclosure relates to high-definition maps, and more particularly, to intersection (IX) node-assisted map building for autonomous vehicle infrastructure.

BACKGROUND

High Definition (HD) maps are an important aspect of autonomous vehicles and their functionality. Autonomous vehicles (AVs) use HD maps to interpret and localize the vehicle position in its operating environment. For accurate localization, the vehicle control system must understand, with precision, where the AV is localized in the world and where the AV is localized in the map.

Absolute accuracy and relative accuracy are both considered when quantifying the overall accuracy of a map. Absolute accuracy is how close a measured value is to a known absolute true value. This metric is often provided in known units such as meters, cm, mm, inches, or feet. Relative Accuracy is how close a measured value is to a standard value on relative terms. Stated in another way, relative accuracy is independent of scale and translation.

Relative accuracy is currently considered to have greater importance to AV operation given that AVs often rely on Light Detection and Ranging (LiDAR) and camera-based localization techniques. HD maps frequently include information such as lane lines, buildings, and other environmental features. HD maps are accurate (that is, having relatively high measured Relative and Absolute accuracy) by representing the geographical location and a geographic localization with a reliable level of precision that may be used by AVs for self-localization and navigation. Using an accurate HD map, an AV can, while operating in a mapped environment, autonomously determine its location in the real-world and determine where the vehicle is positioned with respect to mapped objects. Conventional HD map building systems can generate a relatively accurate map but cannot generate an Absolute accurate map in the absence of one or more of Global Positioning System (GPS) and RTK.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Illustrative Embodiments

The disclosure will be described more fully hereinafter with reference to the accompanying drawings, in which example embodiments of the disclosure are shown, and not intended to be limiting.

High-Definition (HD) maps are an important aspect of autonomous vehicles and their functionality. Autonomous vehicles (AVs) use HD maps to interpret and localize their position. AVs often require an accurate understanding of where the vehicle is localized in the real world, and where the AV is localized in the map. Two terms are well-defined and used to quantify the accuracy of AV maps: Absolute Accuracy & Relative Accuracy.

Absolute accuracy measures how far the real-world coordinates of an observed object differ from the mapped coordinates of that object. For example, a light pole may have an observed real-world latitude, longitude of 42.3546, 83.2578, and a mapped a latitude, longitude of 42.3543, 83.2575. The absolute accuracy of the object in the map is measured by choosing an origin, and evaluating the distance of the mapped object with respect to the origin to a known distance between the same real-world object and the localized origin. The map is not Absolutely accurate in the given example, because the coordinates differ between the actual localized coordinates and the mapped coordinates.

Relative accuracy is a measure of relativeness of the map. An origin is chosen on a map, and ideally features are dimensionally accurate. In a Relatively accurate map, a 2 m line length may be exactly 2 m, but appear in the map in an inaccurate position. For example, a lane line may be 2 m in length in real world, and in an absolute accurate map, the 2 m line length would be measurable in the map as 2 m long. If the relative accuracy of the map is low, then the measurable length of the lane line may be 2.1 m or 1.9 m, etc.

Relative accuracy has been of more importance to AV operation because the AV often relies on LiDAR and camera-based localization techniques. Recent focus has been given to AV localization using GPS and Real-Time-Kinematics (RTK) based localization which has increased the importance of absolute accuracy of a high definition (HD) map. Conventional HD map generation techniques rely on GPS and RTK to generate an Absolutely accurate map. This reliance may not be ideal in some situations, where of GPS or RTK may not be available. For example, in a setting where GPS signals do not transmit adequately for a reliable GPS localization signal, conventional HD map generation techniques may be difficult or impossible to implement.

Simultaneous Localization and Mapping (SLAM) helps to achieve a high Relative accuracy but does not aid in achieving Absolute accuracy. To achieve Absolute accuracy, conventional systems have established a control point using a GPS base station that is calibrated and settled for a period of time to provide an accurate positional reading. In one example of a calibration procedure, 5-8 GPS nodes or points are established on a street at known distances from an origin (which may be, for example, a GPS base station). The positions of the GPS nodes are then measured relative to the GPS base station. After measurements are taken from various points in the region being mapped to the actual known base station position, GPS location of the GPS nodes are measured relative to the actual known base station position, and deviations from the expected relative map locations for those points are quantified. The deviations are measured at 5-10 locations across the mapped region. With the quantified deviations identified and measured in the mapped region, the entire map is shifted by an average measured deviation across the mapped region.

Although this procedure may increase absolute accuracy of the HD map, conventional systems rely on RTK and GPS to establish and measure multiple control points. However, the RTK may not always be available. It may be advantageous, therefore, in those situations and others, to have HD maps created using fixed-position smart intersection (IX) nodes that are equipped with LiDAR sensory systems, where the IX nodes have fixed and known positions and orientations. According to one or more embodiments, a HD map system receives a LiDAR messages from two or more IX nodes positioned at known locations in the mapped area, and combines the LiDAR messages with sensory data received from an vehicle driving in the mapped area to generate an aggregated and optimized HD map based on the combined data sets. This disclosed system may remove the dependency having both of GPS and RTK-based localization active during the map building process.

Figure 1:
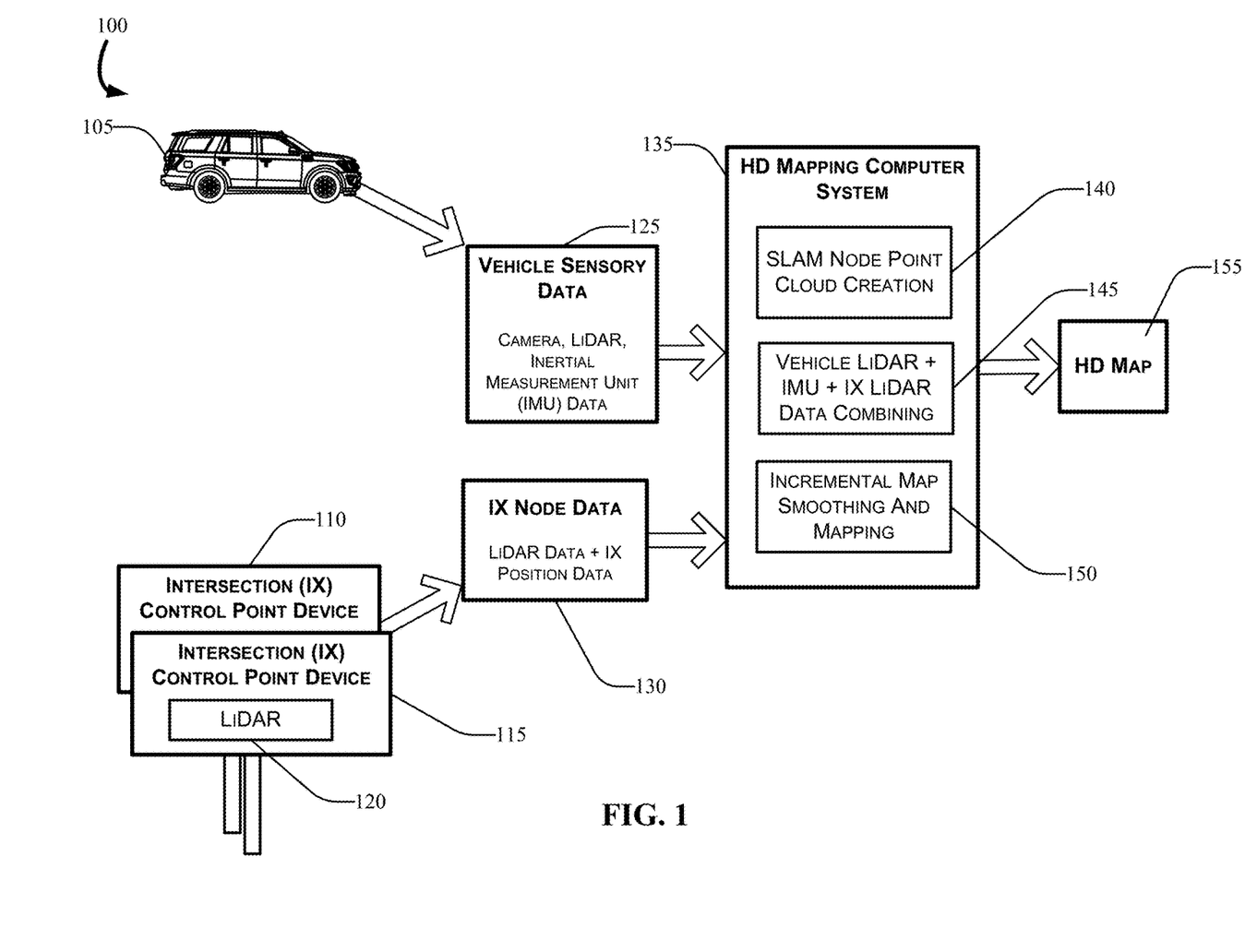
FIG. 1 illustrates an example block diagram of a High Definition (HD) map system in accordance with the present disclosure.

More particularly, a computer-implemented method for generating an HD map may include receiving, via a processor, from two or more IX control devices disposed at a two or more stationary positions having known latitudes longitudes and orientations, first sensory data identifying the position and dimensions of a feature in a mapped region. The processor may generate a plurality of IX nodes based on the first sensory data received from the IX control devices, and receive LiDAR point cloud that includes LiDAR and Inertial Measurement Unit (IMU) data from a vehicle driving in the mapped region. The LiDAR point cloud may include a SLAM map data having second dimension information and second position information associated with the feature in the mapped region. The processor may generate, without GPS and/or real-time kinematics information, an optimized High-Definition (HD) map using batch optimization, by implementing map smoothing or similar techniques. FIG. 1 illustrates an example block diagram of a High Definition (HD) mapping system 100 in accordance with the present disclosure. The HD map system 100 may include a vehicle 105, a first IX control point device 110, a second IX control point device 115, and an HD map computing system 135.

As a brief overview of the HD map system 100, the HD map system 100 may take in IX node data 130 that can include sensory data at the IX control points associated with the IX control point devices 115 and 135. The IX node data 130 may include dimension information (e.g., length, width, height) and position information (e.g., latitude, longitude) associated with features in the operational environment of the vehicle 105. Features may be, for example, a building, a road, a curb, a street marking, etc. The IX node (e.g., the IX control point device 115) may include information associated with size and localization of features in the mapped environment that is obtained using sensory devices disposed onboard the respective with the IX control point devices 110 and 115.

The IX control point sensory devices may include a LiDAR 120 disposed onboard the device, among other sensors such as camera systems, SONAR, RADAR, or other sensory devices. The IX control points may be disposed in the operating environment at fixed and known positions, and calibrated in advance of mapping operations. Although some embodiments describe two IX control point devices 110 and 115, it should be appreciated that any number of control point devices (two or more) may be used, which may increase Absolute and Relative accuracy of the HD map 155.

The vehicle 105 may obtain vehicle sensory data 125 using onboard sensory equipment such as a red-green-blue (RGB) camera system, a LiDAR system, and/or an IMU. The vehicle 105 may traverse the mapped area (e.g., the area depicted with respect to FIG. 2) by driving along the roadways in the area and collecting vehicle sensory data at predetermined intervals as the vehicle travels. Predetermined intervals may be time based (e.g., each 1 second, three seconds, 10 seconds, etc.) and/or may be distance based (e.g., every 5 m, 8 m, 20 m, etc.).

The HD map system 100 may further receive IX node data 130, which may include LiDAR, camera, or other sensory-based SLAM data from the IX control point devices 110, 115, and combine the IX node data 130 with the vehicle sensory data 125 using an HD mapping computer system 135.

The HD mapping computer system 135 may receive and combine the vehicle sensory data with the IX control point with the IX node data 130 and create a plurality of IX nodes (depicted in FIG. 4 and discussed hereafter) to create a HD map 155. Although not expressly described herein, the HD mapping computer system may be a typical computing system comprising a memory and processor (not shown in FIG. 1), and may be wired or connected wirelessly with the IX control point devices 110 and 115. In one or more embodiments, the HD mapping computing system 135 may connect wirelessly with the vehicle 105, either directly or via a computing network as described with respect to FIG. 2.

The HD mapping computer system 135 may receive the vehicle sensory data 125 and the IX node data 130, and generate the HD map 155 based on the vehicle sensory data sets 125 and 130 with a SLAM pose graph creation step 140, a SLAM and LiDAR and IMU data combining step 145, and an incremental map smoothing and mapping step 150. Each of these steps are discussed in greater detail in the following sections.

Figure 2:
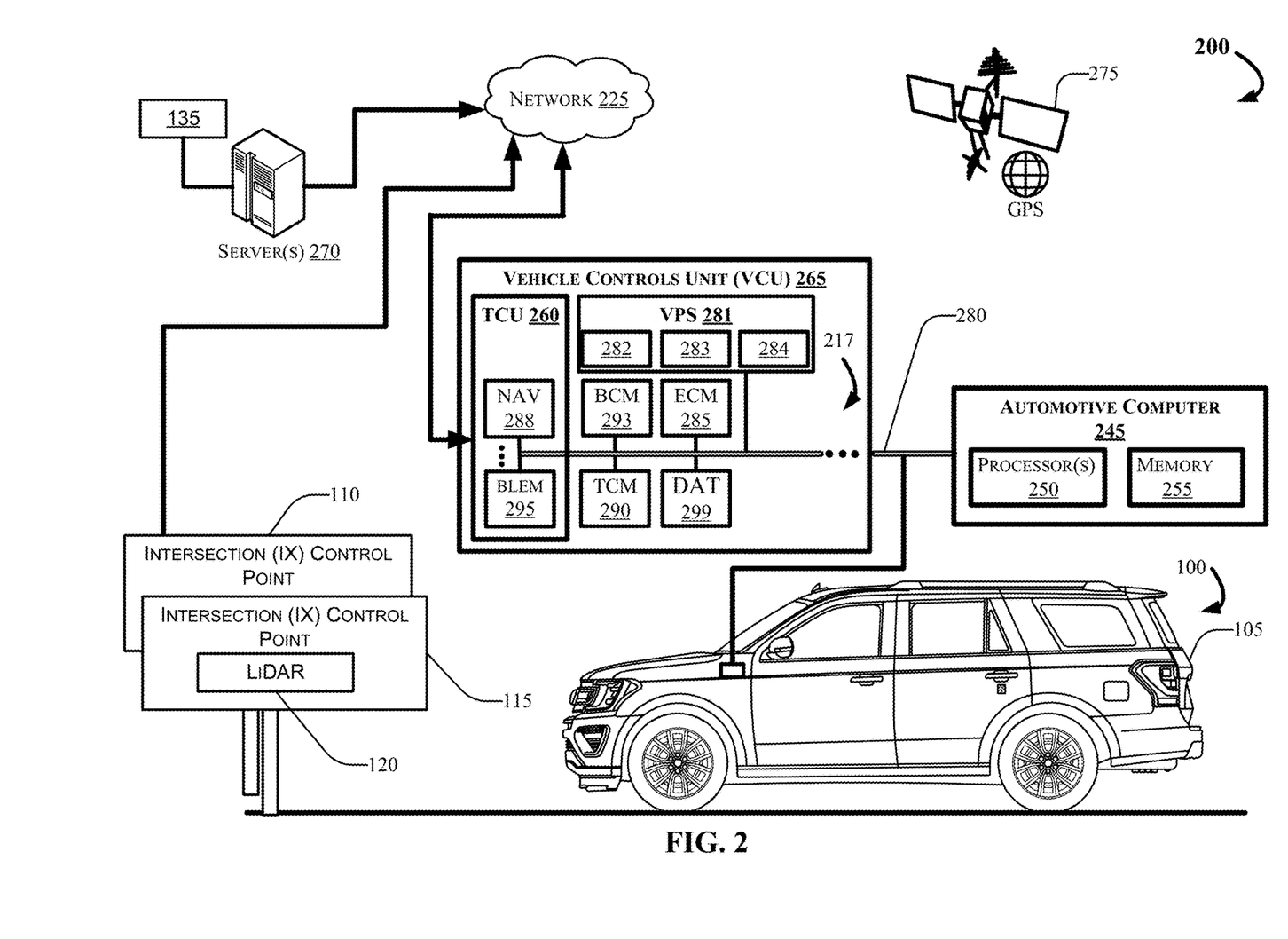
FIG. 2 depicts an example computing environment in which techniques and structures for providing the systems and methods disclosed herein may be implemented.

FIG. 2 depicts an example computing environment 200 that can include the vehicle 105. Although described herein as obtaining vehicle sensory data 125 (as shown in FIG. 1) using a single vehicle 105, it should be appreciated that any number of vehicles may be used to collect the vehicle sensory data. The vehicle 105 may include an automotive computer 245 and a Vehicle Controls Unit (VCU) 265 that can include a plurality of electronic control units (ECUs) 217 disposed in communication with the automotive computer 245.

The vehicle 105 may also receive and/or be in communication with a GPS 275. The GPS 275 may be a satellite system such as the global navigation satellite system (GLNSS), Galileo, or other similar system. In other aspects, the GPS 275 may be a terrestrial-based navigation network. In some embodiments, the vehicle 105 may utilize a combination of GPS and Dead Reckoning responsive to determining that a threshold number of satellites are not recognized.

The automotive computer 245 may be or include an electronic vehicle controller, having one or more processor(s) 250 and memory 255. The automotive computer 245 may, in some example embodiments, be disposed in communication with the one or more server(s) 270. The server(s) 270 may be part of a cloud-based computing infrastructure or be single-station computing device(s), and may be associated with and/or include a Telematics Service Delivery Network (SDN) that provides digital data services to the vehicle 105 and other vehicles (not shown in FIG. 2) that may be part of a vehicle fleet used for mapping the region.

Although the GPS or RTK obtained from the TCU may be used to obtain the vehicle sensory data 125, aspects of the present disclosure describe methods for generating the HD map 155 (as shown in FIG. 1) without the use of the GPS 275, and/or without RTK (obtained from a Telematics Control Unit 260).

In one aspect, the server(s) 270 may include the HD mapping computer system 135 (as shown in FIG. 1) as an integrated or connected computing sub-system. In one embodiment, the HD mapping computer system may be instantiated on the server(s) 270 as one or more applications that receive the vehicle sensory data 125 and IX node data 130 (depicted in FIG. 1), create a SLAM pose graph (not shown in FIG. 2), combine the point cloud data from the vehicle and IX node, and generate the HD map 155 that meets or exceeds a threshold of Absolute accuracy (e.g., 1-2 cm) after incremental smoothing and mapping. In another aspect, the HD mapping computer system 135 may be a separate computing system disposed in communication with the server(s) 270.

The vehicle 105 may take the form of any passenger or commercial automobile such as, for example, a car, a truck, a crossover vehicle, a van, a minivan, a taxi, a bus, etc., and may be configured and/or programmed to include various types of automotive drive systems.

Further, the vehicle 105 may be a manually driven vehicle, and/or be configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4.

A vehicle having a Level-0 autonomous automation may not include autonomous driving features.

A vehicle having Level-1 autonomy may include a single automated driver assistance feature, such as steering or acceleration assistance. Adaptive cruise control is one such example of a Level-1 autonomous system that includes aspects of both acceleration and steering.

Level-2 autonomy in vehicles may provide driver assist technologies such as partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation.

Level-3 autonomy in a vehicle can provide conditional automation and control of driving features. For example, Level-3 vehicle autonomy may include "environmental detection" capabilities, where the autonomous vehicle (AV) can make informed decisions independently from a present driver, such as accelerating past a slow-moving vehicle, while the present driver remains ready to retake control of the vehicle if the system is unable to execute the task.

Level-4 AVs can operate independently from a human driver, but may still include human controls for override operation. Level-4 automation may also enable a self-driving mode to intervene responsive to a predefined conditional trigger, such as a road hazard or a system failure.

Level-5 AVs may include fully autonomous vehicle systems that require no human input for operation, and may not include human operational driving controls.

According to embodiments of the present disclosure, the HD map 155 and creation of the HD map using the HD mapping system 100 may be accomplished using a manual or autonomous vehicle. For example, the HD map system 100 may be configured and/or programmed to operate with a non-autonomous vehicle, or may be configured and/or operate with a semi-autonomous or fully-autonomous vehicle. Accordingly, the HD mapping system 100 may provide some aspects of human control to the vehicle 105, when the vehicle is configured as an AV. It should also be appreciated that AVs, semi-autonomous vehicles, and manually driven vehicles may all utilize the HD map generated by the HD mapping system 100.

The network(s) 225 illustrate an example communication infrastructure in which the connected devices discussed in various embodiments of this disclosure may communicate. The network(s) 225 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The automotive computer 245 may be installed in an engine compartment of the vehicle 105 (or elsewhere in the vehicle 105) and operate as a functional part of the HD mapping system 100, in accordance with the disclosure. The automotive computer 245 may include one or more processor(s) 250 and a computer-readable memory 255, which may store one or more programs (not shown in FIG. 2) for collecting sensory data, generating SLAM information and causing vehicle sensory systems to collect LiDAR, camera, and inertial measurement unit data. In other aspects, the program may store instructions that cause the processor to generate and transmit SLAM data, camera data, and inertial measurement unit data to the HD mapping computer system 135 via a vehicle communication system such as the TCU 260.

The one or more processor(s) 250 may be disposed in communication with one or more memory devices disposed in communication with the respective computing systems (e.g., the memory 255 and/or one or more external databases not shown in FIG. 2). The processor(s) 250 may utilize the memory 255 to store programs in code and/or to store data for performing aspects in accordance with the disclosure. The memory 255 may be a non-transitory computer-readable memory storing a HD mapping program code. The memory 255 can include any one or a combination of volatile memory elements (e.g., dynamic random access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The VCU 265 may share a power bus 280 with the automotive computer 245, and may be configured and/or programmed to coordinate the data between vehicle 105 systems, connected servers (e.g., the server(s) 270), and other vehicles (not shown in FIG. 2) operating as part of a vehicle fleet (not shown in FIG. 2). The VCU 265 can include or communicate with any combination of the ECUs 217, such as, for example, a Body Control Module (BCM) 293, an Engine Control Module (ECM) 285, a Transmission Control Module (TCM) 290, the TCU 260, a Driver Assistances Technologies (DAT) controller 299, etc. The VCU 265 may further include and/or communicate with a Vehicle Perception System (VPS) 281.

The VPS 281 may include sensory devices such as, for example, a LiDAR 282, a camera system 283, and an IMU 284, among other sensory devices. The automotive computer 245 may cause the VPS 281 to engage the sensory devices for map data generation as the vehicle 105 traverses the mapped region (described in greater detail with respect to FIG. 3). For example, the processor 250 may cause the LiDAR 282 to generate LiDAR data as the vehicle drives the mapped region. The LiDAR 282 may capture physical aspects such as curbs, roadway features, buildings, and stationary objects in the mapped region, where the LiDAR includes dimensional information such as precisely (e.g., plus or minus 1-2 cm) that may be incorporated with LiDAR and other sensory data generated by the IX control point devices 110 and 115 (as shown in FIG. 1). The vehicle 105 may traverse the mapped area, thus capturing more than one angle of LiDAR representation of a feature in the mapped region. The processor 250 may store LiDAR data in the memory 255, and/or transmit the data to the HD mapping computing system 135 via the TCU 260.

According to another embodiment, the processor(s) 250 may also cause the camera system 283 to capture image data of the features in the mapped area, where the image information is usable for generation of the HD map 155. The camera system 283 may include one or more of a monochrome image processor, a red-green-blue (RGB) image processor, a thermographic image processor, or other type of image sensory device.

In other aspects, the processor(s) 250 may cause the IMU 284 to generate inertial measurements associated with vehicle movements as the LiDAR 282, camera system 283 (or other sensory devices know in the art) generate the vehicle sensory data, where the IMU data provides a secondary or tertiary body of information that may be correlated with the LiDAR for generation of the SLAM data used by the HD map computing system for generation of the HD map 155. For example, the IMU data may be combined with IX point cloud data for creation of the HD map 155.

The TCU 260 can be configured and/or programmed to provide vehicle connectivity to wireless computing systems onboard and offboard the vehicle 105, and may include a Navigation (NAV) receiver 288 for receiving and processing a GPS signal from the GPS 275, a BLE® Module (BLEM) 295, a Wi-Fi transceiver, a UWB transceiver, and/or other wireless transceivers (not shown in FIG. 2) that may be configurable for wireless communication between the vehicle 105 and other systems, computers, and modules. The TCU 260 may be disposed in communication with the ECUs 217 by way of a bus 280. In some aspects, the TCU 260 may retrieve data and send data as a node in a CAN bus. For example, the TCU 260 may receive GPS coordinates from the GPS 275, and coordinate the GPS coordinates to the HD mapping computing system 135 in addition to the vehicle sensory data 125. It should be appreciated, however, that one benefit of the HD mapping system 100 includes the ability to generate the HD map 155 (as shown in FIG. 1) without RTK and/or GPS in the event that one of RTK GPS is not available.

The BLEM 295 may establish wireless communication using Bluetooth® and BLE® communication protocols by broadcasting and/or listening for broadcasts of small advertising packets, and establishing connections with responsive devices that are configured according to embodiments described herein. For example, the BLEM 295 may include Generic Attribute Profile (GATT) device connectivity for client devices that respond to or initiate GATT commands and requests.

The bus 280 may be configured as a Controller Area Network (CAN) bus organized with a multi-master serial bus standard for connecting two or more of the ECUs 217 as nodes using a message-based protocol that can be configured and/or programmed to allow the ECUs 217 to communicate with each other. The bus 280 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 217 may communicate with a host computer (e.g., the automotive computer 245, the HD mapping system 100, and/or the server(s) 270, etc.), and may also communicate with one another without the necessity of a host computer. The bus 280 may connect the ECUs 217 with the automotive computer 245 such that the automotive computer 245 may retrieve information from, send information to, and otherwise interact with the ECUs 217 to perform steps described according to embodiments of the present disclosure. The bus 280 may connect CAN bus nodes (e.g., the ECUs 217) to each other through a two-wire bus, which may be a twisted pair having a nominal characteristic impedance. The bus 280 may also be accomplished using other communication protocol solutions, such as Media Oriented Systems Transport (MOST) or Ethernet. In other aspects, the bus 280 may be a wireless intra-vehicle bus.

The VCU 265 may control various loads directly via the bus 280 communication or implement such control in conjunction with the BCM 293. The ECUs 217 described with respect to the VCU 265 are provided for example purposes only, and are not intended to be limiting or exclusive. Control and/or communication with other control modules not shown in FIG. 2 is possible, and such control is contemplated.

In an example embodiment, the ECUs 217 may control aspects of vehicle operation and communication using inputs from human drivers, inputs from an autonomous vehicle controller, the HD mapping system 100, and/or via wireless signal inputs received via the wireless connection(s) from other connected devices. The ECUs 217, when configured as nodes in the bus 280, may each include a central processing unit (CPU), a CAN controller, and/or a transceiver (not shown in FIG. 2). In other aspects, the ECUs may also be configured and/or programmed to perform one or more steps in generating the vehicle sensory data 125 including SLAM pose graph generation, LiDAR sensory data collection, camara data collection, among other aspects.

The BCM 293 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 293 may also operate as a gateway for bus and network interfaces to interact with remote ECUs (not shown in FIG. 2).

The BCM 293 may coordinate any one or more functions from a wide range of vehicle functionality, including energy management systems, alarms, vehicle immobilizers, driver and rider access authorization systems, AV control systems, power windows, doors, actuators, and other functionality, etc. The BCM 293 may be configured for vehicle energy management, exterior lighting control, wiper functionality, power window and door functionality, heating ventilation and air conditioning systems, and driver integration systems. In other aspects, the BCM 293 may control auxiliary equipment functionality, and/or be responsible for integration of such functionality.

The computing system architecture of the automotive computer 245, the VCU 265, and/or the HD mapping system 100 may omit certain computing modules. It should be readily understood that the computing environment depicted in FIG. 2 is an example of one possible implementation according to the present disclosure, and thus, it should not be considered limiting or exclusive.

Figure 3:
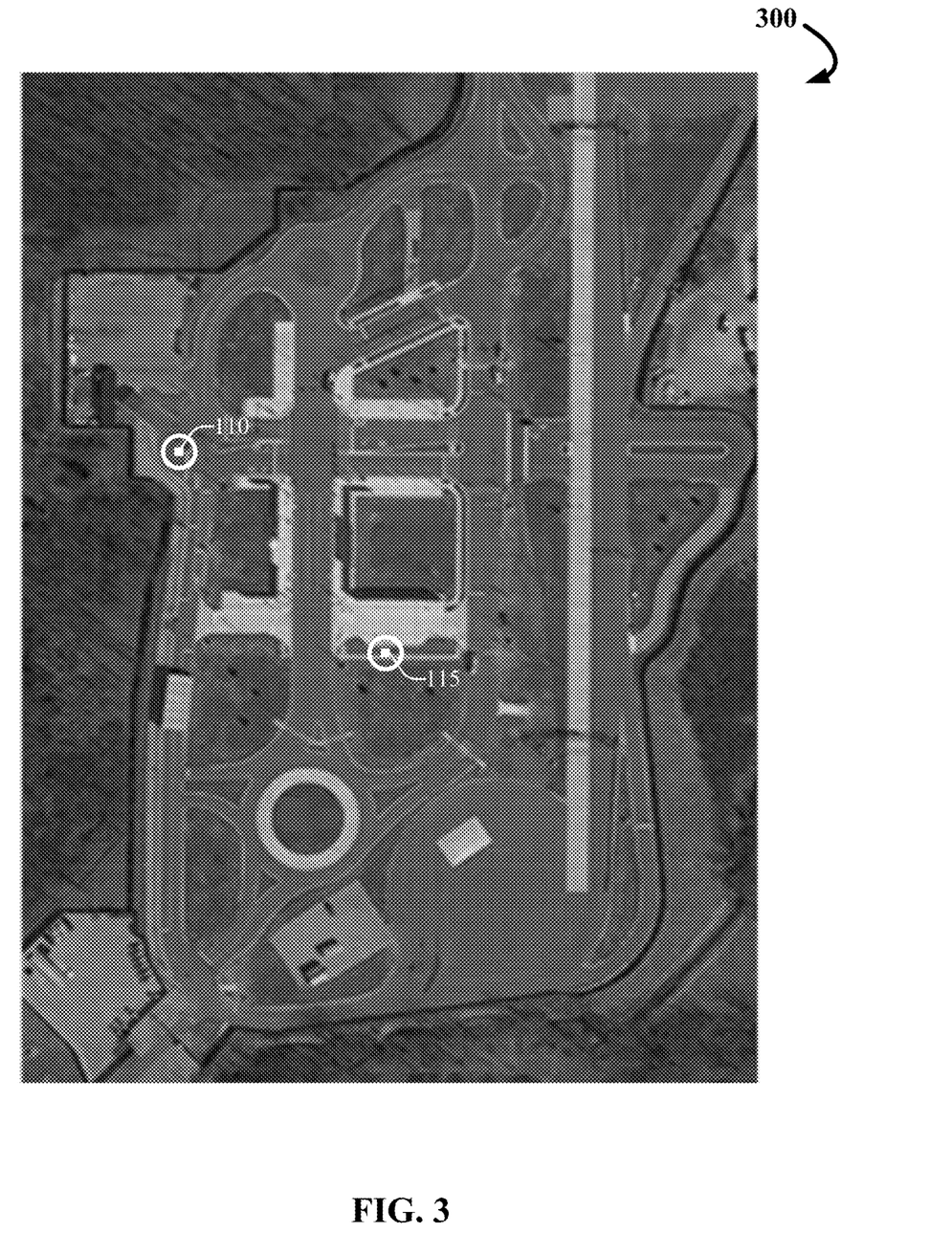
FIG. 3 depicts an example satellite image of region to be mapped, and placement of two intersection (IX) control points (or nodes) in accordance with the present disclosure.

FIG. 3 depicts an example satellite image of region 300 to be mapped, and placement of two intersection (IX) control point devices 110 and 115, respectively, which may be disposed in two fixed and known locations in the mapped region 300, in accordance with the present disclosure. For some AVs to operate in an operational environment, the area must be mapped. According to one embodiment, the mapped region 300 may include two or more control point devices 110 and 115 disposed in separate but stationary positions in the map environment. Each IX control point device (110, 115, etc.) may be an infrastructure-mounted sensor node having sensors such as, for example, LiDAR, a camera system (e.g., RGB, etc.) SONAR, GPS, or other sensory devices. The IX control point devices have known localization (e.g., precisely known latitude, longitude) and known position/orientations. For example, each of these nodes may undergo an initial and routine calibration process using during which the node's respective position and orientation is obtained, verified, and/or calibrated.

Although not shown, the vehicle, such as vehicle 105, may drive throughout the mapped region 300 while periodically obtaining sensory data as the vehicle drives throughout the map region 300. The VPS 281 may generate the vehicle sensory data, such as vehicle sensory data 125 (as shown in FIG. 1) while driving through the mapped region 300, and transmit the vehicle sensory data 125 to the HD mapping computer system, such as HD mapping computing system 135, in real time, and/or may be transmitted to the HD mapping computing system, such as HD mapping computing system 135, after completion of the mapping operations. For example, the VPS 281 may generate multiple LiDAR maps of a feature in the mapped region as the vehicle approaches the feature, again as the vehicle is proximate to the feature, and again as the vehicle passes the feature. The dynamically changing position of the vehicle 105 as it traverses the mapped region may therefore provide multiple angles of the feature, which can iteratively reduce linear error in the HD map.

In other aspects, the VPS 281 may also provide imagery of the feature from the same dynamically changing angles, and may produce IMU data indicative of inertial changes experienced by the vehicle 105 as the vehicle sensory data 125 is generated. The vehicle sensory data and the IX node data 130 are combined and optimized by the HD mapping computer system for generation of the HD map 155. According to one embodiment, the VPS 181 may provide advantages that can reduce or eliminate linear errors of feature representation by leveraging vehicle systems to coordinate multiple lines of sensory information (e.g., the vehicle sensory data 125) used for generation of the HD map 155. Stated another way, the precisely-localized and oriented IX control point devices 110 and 115 may provide control points for adjusting the vehicle sensory data 125 on the HD map 155 that is generated by vehicle sensory system as it observes features in the mapped region from the vehicle's dynamically-changing position. This feature may provide a distinct advantage for increasing the Absolute accuracy of the HD map as compared with uncombined stationary IX node data or VPS data.

Figure 4:
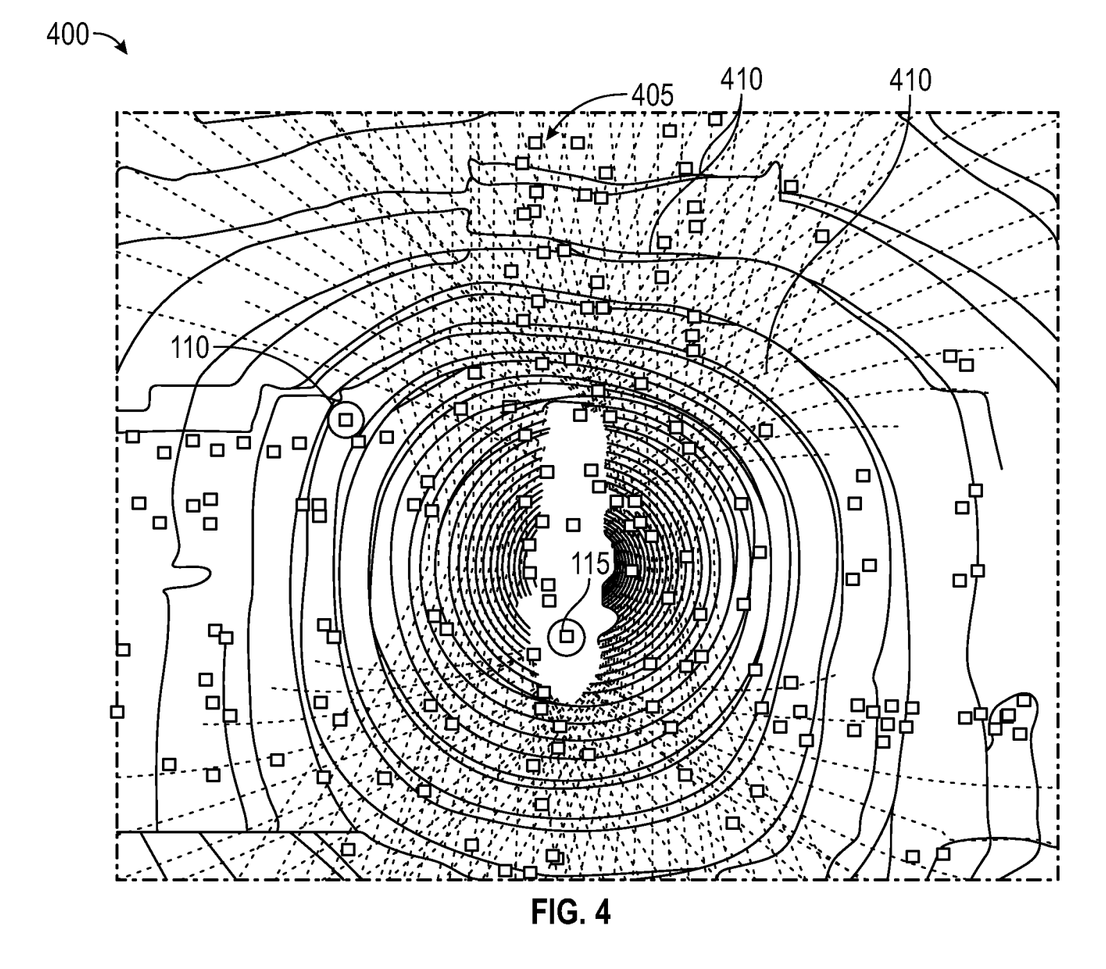
FIG. 4 depicts a map of IX control points generated by the HD map system of FIG. 1 in accordance with the present disclosure.

FIG. 4 depicts a map 400 of IX control points 405 generated by the HD map system 100 illustrated in FIGS. 1 and 2 by combining LiDAR point cloud data (e.g., SLAM) data collected by the vehicle 105 combined with the IX node data 130 obtained by the IX control point devices 110, 115 (i.e., control nodes), in accordance with the present disclosure. The map 400 is depicted with a plurality of control points 405 that that represent discrete positions at which the vehicle 105 and the IX control point devices 110 and 115 collect sensory data in the mapped region. For example, the IX control point devices 110 and 115 illustrate the stationary positions at which those devices are disposed in the mapped region. Being stationary devices, the control nodes may be positioned and fixed in the mapped region at fixed positions, where each respective position may have a first known and precisely defined latitude longitude and a known and precisely defined orientation with respect to pointing angle and rotation from a known compass direction. Although only two IX control points 405 are shown in FIG. 4, it should be appreciated that the HD mapping system 100 may include any number of control nodes. A plurality of LiDAR sensory lines 115 are depicted in FIG. 4 representing LiDAR signals radiating from a single IX control point device 115. For the sake of clarity, the LiDAR sensory lines associated with the control point device 110 are not shown. The IX control point device 115 is stationary, and thus, the LiDAR and other sensory devices disposed as part of the IX control point device 115 may take repeated sensory measurements of its surrounding environment with little expected variation from one measurement to the next subsequent measurement. The control point devices 110 and 115 may sense the dimension and position of map features from two or more unchanging control points by which similar sensory devices disposed onboard the vehicle 105 may be calibrated and adjusted during the incremental map smoothing and mapping step 150 (as shown in FIG. 1).

The other dots (that are not the IX control point devices 110 and 115) depicted in FIG. 4 represent discrete vehicle positions at which the vehicle 105 collects the vehicle sensory data 125 while driving in the mapped region 300. At each respective IX control point, HD map system 100 may collect the vehicle sensory data 125 using the LIDAR 282, the camera system 283, the IMU 284, and/or other sensory devices onboard the vehicle 105 (e.g., the VPS 281 as described with respect to FIG. 2). Each node point shown in FIG. 4 (with the exception of the control node points associated with the stationary devices (e.g., the IX control point devices 110 and 115) illustrate a point at which the VPS 281 may measure the sensory data, and may store the sensory data in a sensory database (not shown in FIGS. 1-4)

disposed onboard the vehicle 105 and/or remotely (e.g., in a distributed data storage system). Although not shown for clarity, each respective control point of the plurality of control points 405 have LiDAR sensory lines that radiate from each respective point of measurement in all directions. The vehicle 105 may generate SLAM node data (e.g., the vehicle sensory data 125) as it traverses the mapped region 300, and transmit the vehicle sensory data 125 to the HD mapping computer system 135 and/or store the data onboard the vehicle 105 in the memory 255.

Accordingly, the IX control point devices 110 and 115 may generate sensory data (e.g., the IX node data 130) using the IX node LiDAR map (not shown separate from the combined map of FIG. 4), the vehicle sensory data map (also not shown separately from the combined map 400 of FIG. 4) to generate the HD map 155 after the incremental map smoothing and mapping. Of the two LiDAR maps (one created by the IX control point devices 110 and 115, and the other created by the VPS 181 as the vehicle 105 traverses the mapped region), the IX control point-derived maps are used as a control point given the stationary and precisely known location(s) of the IX control point devices, and are used as base points for position shifting each of the plurality of SLAM nodes generated by the vehicle sensory system. The HD mapping computer system 135 may combine the vehicle sensory data 125 with the IX node data 130 to form a LiDAR point cloud (e.g., as shown in FIG. 5).

Figure 5:
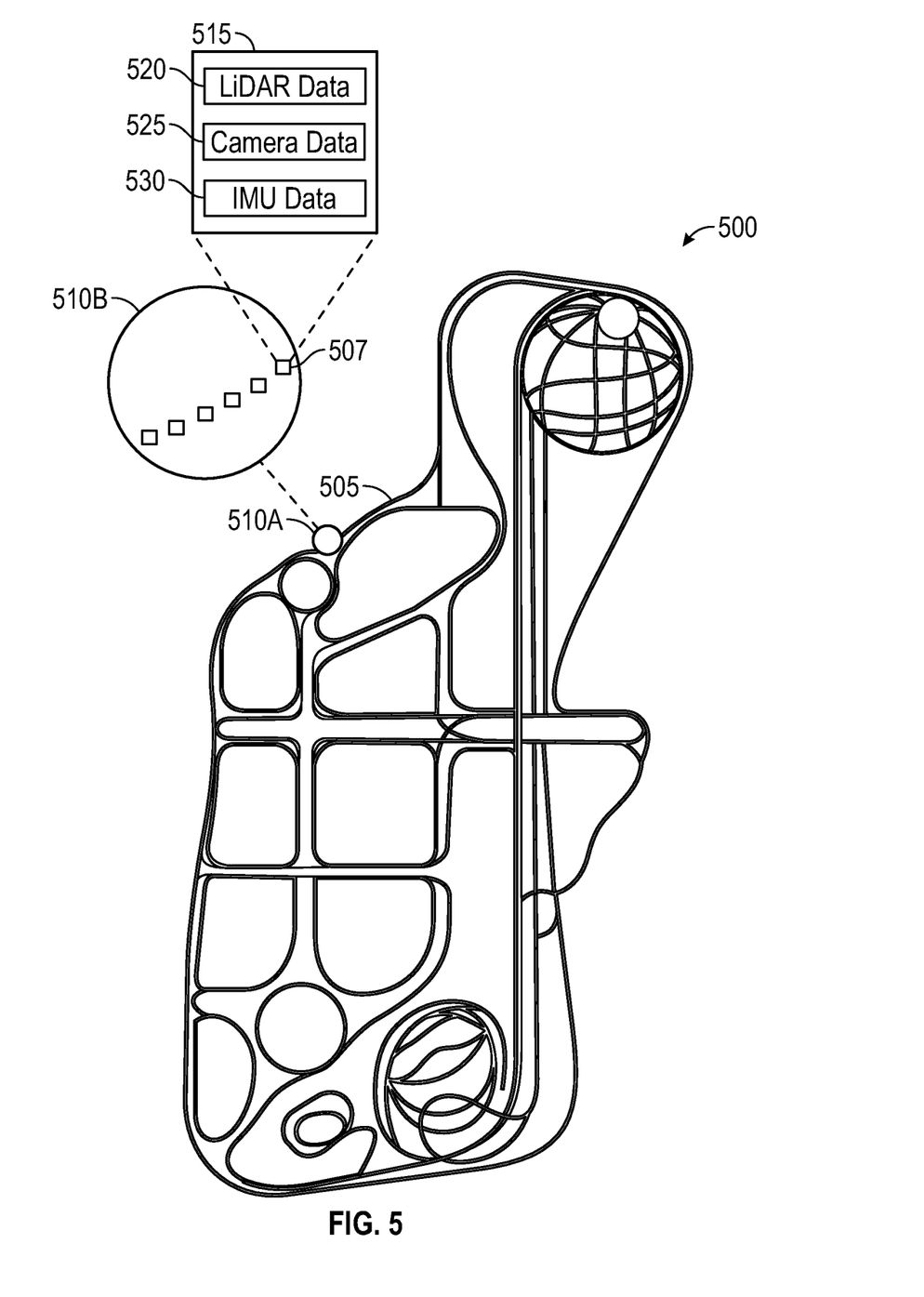
FIG. 5 illustrates an example LiDAR point cloud comprising a combination of Simultaneous Localization and Mapping (SLAM) node data obtained by the vehicle, and IX node data obtained by the IX control nodes in accordance with the present disclosure.

FIG. 5 illustrates an example SLAM node map 500 that may include a combination of SLAM node data (e.g., the nodes depicted in FIG. 4 obtained by the VPS 281), and IX node data obtained by the IX control point devices 110 and 115, in accordance with the present disclosure. Although depicted in FIG. 5 as a map of continuous lines 505 the zoomed-in portion 510B of the map section 510A illustrates a plurality of SLAM nodes 507 that represent vehicle sensory data 515 collected at incremental distances (e.g., 0.5-1 m) along the vehicle travel path as the vehicle 105 traverses the mapped region 300 fused with the point cloud data (e.g., the IX node data 130) generated by the IX control point devices 110 and 120. Each of the SLAM atom nodes 507 may be associated with the fixed and known localization and orientation of the IX control point devices 110 and 115 fused with the vehicle sensory data 125 collected using the VPS 281. For example, the SLAM nodes may include LiDAR data 520, Camera data 525, and/or IMU data 530, where the data was generated by both the vehicle and the IX control point devices 110. Although, most of the nodes 507 may originate from the VPS 281, at least two of the nodes derive from the IX node data 130 (as shown in FIG. 1).

During the data collection process, the vehicle passes through the region where the IX is located. As a result, the vehicle LiDAR and the IX LiDAR see the same environment. The road boundaries, the same 3D structures etc. appear both in the IX and vehicle data. During the SLAM process, the matches in environment generate constraints which are used by the SLAM batch optimization method. The system may assign respectively more weight to any constraint that involves IX, and as a result, the map aligns more precisely according to the location of the IX. The HD mapping computer system 135 may generate the optimized HD map by smoothing the plurality of IX nodes 507 (i.e., SLAM nodes) using a batch optimization algorithm. An example batch optimization algorithm is described in the paper titled, *Incremental Smoothing and Mapping* (Michael Kaess, Georgia Institute of Technology, December 2008, which is incorporated herein by reference) (hereafter "Kaess"). According to one embodiment, the IX node data 130 is obtained from two stationary control points associated with the IX control point devices 110 and 120 (also referred to herein as IX nodes and/or IX control points), whereas in Kaess, the optimization problem is solved with dynamic control points. Except for the IX control point devices 110 and 120, the other nodes 507 move relative to each other to globally optimize and minimize the linearization error to be less than a predetermined threshold for linearization error. For example, the threshold for linearization error may be plus or minus 1 cm-2 cm, for example, and thus, generate an Absolutely accurate HD map 155. Stated in simple terms, the IX control points at which the IX control point devices 110 and 115 act as a fiducial/ground control points that are stationary with fixed and known positions. For example, the IX control point devices 110 and 115 have a precisely (e.g., within 1-2 cm) known latitude longitude, roll, pitch and heading with respect to North-East-Down coordinate frame (with units in radians) and a precisely known orientation.

Figure 6:
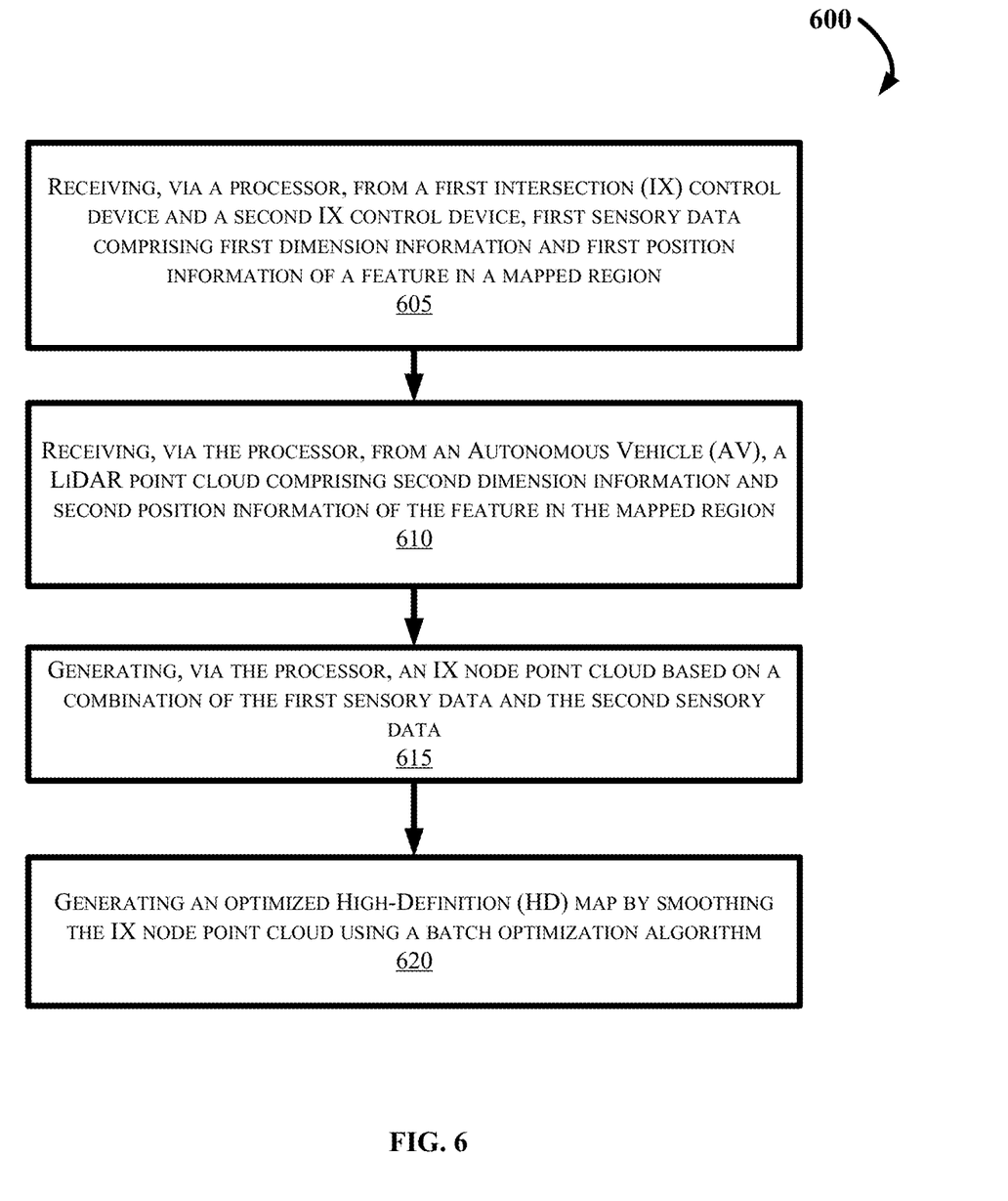
FIG. 6 depicts a flow diagram of an example method for building an HD map using the HD map system of FIG. 1 in accordance with the present disclosure.

FIG. 6 depicts a flow diagram of an example method 600 for building an HD map using the HD map system of FIG. 1, in accordance with the present disclosure. At step 605, the method 600 may commence with receiving, via a processor, from a first intersection (IX) control device and a second IX control device, first sensory data comprising first dimension information and first position information of a feature in a mapped region.

At step 610, the method 600 may further include receiving, via the processor, from a vehicle sensory system, a LiDAR point cloud comprising second dimension information and second position information of the feature in the mapped region. In one aspect, the HD computing system may receive the LiDAR point cloud as a single data transmission following a mapping trip where the vehicle drives in the mapped region. In another embodiment, the HD map computing system may receive the LiDAR point cloud data incrementally via the vehicle TCU as the vehicle proceeds through each discrete step in its mapping mission.

For example, in one aspect, the LiDAR point cloud is collected by the AV while driving along routes in the mapped region. The sensory data may include, among other data, LiDAR sensory data, camara data, and Inertial Measurement Unit (IMU) data. In one aspect, the method includes causing the automotive computer processor to instantiate one or more SLAM generating programs that cause the vehicle perception system to obtain SLAM data for generating the LiDAR point cloud using the LiDAR module and/or any other of the vehicle sensory devices such as the camera system and the IMU.

In one aspect, the vehicle sensory system may be configured and/or programmed for obtaining the vehicle sensory data at discrete points along the route as the vehicle drives along routes in the mapped region. For example, the vehicle sensory system may obtain LiDAR data every 1 m, 2 m, 4 m, etc. Accordingly, the LiDAR point cloud may represent multiple image, LiDAR, and IMU data associated with features in the mapped region, where data samples associated with the features are captured from various angles and views as the vehicle changes position.

This step can further include generating the LiDAR point cloud using camera data, and more particularly, monochromatic or RGB image information via the vehicle sensory system, and receiving the sensory information via the HD map computing system processor. For example, the vehicle sensory system may obtain a plurality of images that capture digital imagery of the feature in the mapped region as the vehicle approaches the feature, as the vehicle is proximate to the feature, and as the vehicle passes the feature.

At step 615, the method 600 may further include generating, via the processor, a plurality of IX nodes based on a combination of the first sensory data and the LiDAR point cloud. The plurality of IX nodes may include a first IX node at a first fixed and know position, and a second IX node at a second fixed and know position. In one aspect, the first IX control device may be disposed in the mapped region at a first stationary position having a first known latitude and a first known longitude. In another aspect, the second IX control device may be disposed at a second stationary position having a second known latitude and a second known longitude. In one aspect, this step may include combining the SLAM (e.g., the LiDAR point cloud) obtained by the vehicle sensory system with the IX node data generated by the IX control node devices.

At step 620, the method 600 may further include generating an optimized HD map comprising the feature in the mapped region by smoothing the combined IX node and SLAM pose graph using a batch optimization algorithm. This step may include smoothing the LiDAR point cloud data using the batch optimization algorithm by reducing linearization error of the plurality of IX nodes to be less than a threshold for linearization error. According to embodiments described herein, first sensory data and the LiDAR point cloud do not include GPS data. According to other aspects, first sensory data and the LiDAR point cloud data do not include Real-Time-Kinematics (RTK) information. The HD map system may therefore generate an Absolute and Relative accurate HD map in the absence of one or more of UPS and RTK.

This step may further include incremental map smoothing and mapping including determining, for\ the IX control point devices 110 and 115, a precisely (e.g., within 1-2 cm) known latitude longitude, roll, pitch and heading with respect to North-East-Down coordinate frame (with units in radians) and a precisely known orientation.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for controlling an Autonomous Vehicle (AV), comprising:

generating, by a first intersection (IX) control device comprising a first Light Detection and Ranging (LiDAR) system and a second IX control device comprising a second LiDAR system, first sensory data comprising first dimensional information and first position information of a stationary environmental feature in a mapped region;

receiving, via a processor, from the first IX control device and the second IX control device, the first sensory data;

collecting, by one or more sensors disposed in the AV, a LiDAR point cloud and Simultaneous Localization and Mapping (SLAM) data associated with the stationary environmental feature in the mapped region while the AV is driving along one or more roadways in the mapped region;

receiving, via the processor, from the AV, the LiDAR point cloud and the SLAM data;

generating, via the processor, based on a combination of the LiDAR point cloud and the SLAM data, second sensory data comprising second dimensional information and second position information of the stationary environmental feature in the mapped region;

generating, via the processor, a plurality of IX node data points based on a combination of the first sensory data and the second sensory data, wherein the plurality of IX node data points comprises a first IX node data point associated with the first IX control device and a second IX node data point associated with the second IX control device;

generating an optimized High-Definition (HD) map comprising the stationary environmental feature in the mapped region by smoothing the plurality of IX node data points using a batch optimization algorithm, wherein the batch optimization algorithm uses the first IX node data point as a first static IX control point and the second IX node data point as a second static IX control point; and navigating the AV along the one or more roadways in the mapped region using the optimized HD map.

2. The method according to claim 1, wherein the batch optimization algorithm reduces linearization error of the plurality of IX node data points to be less than a threshold for linearization error by smoothing the plurality of IX node data points without moving the first IX node data point or the second IX node data point relative to a remainder of the plurality of IX node data points.

3. The method according to claim 1, wherein the first IX control device is disposed in the mapped region at a first stationary position having a first known latitude and a first known longitude and the second IX control device is disposed at a second stationary position having a second known latitude and a second known longitude, and wherein a precision with which the stationary environmental feature is aligned on the optimized HD map is based on the first stationary position and the second stationary position in the mapped region.

4. The method according to claim 1, wherein the first sensory data is generated based on LiDAR sensory data collected by the first LiDAR system of the first IX control device and the second LiDAR system of the second IX control device.

5. The method according to claim 1, wherein the LiDAR point cloud comprises LiDAR sensory data and Inertial Measurement Unit (IMU) data.

6. The method according to claim 1, wherein the first sensory data and the LiDAR point cloud do not include Global Positioning System (GPS) data.

7. The method according to claim 1, wherein the first sensory data and the LiDAR point cloud do not include Real-Time-Kinematics (RTK) information.

8. A system, comprising:
a processor; and
a memory for storing executable instructions, the processor programmed to execute the instructions to:
    generate, by a first intersection (IX) control device comprising a first Light Detection and Ranging (LiDAR) system and a second IX control device comprising a second LiDAR system, first sensory data comprising first dimensional information and first position information of a stationary environmental feature in a mapped region;
    receive, from the first IX control device and the second IX control device, the first sensory data;
    collect, by one or more sensors disposed in an Autonomous Vehicle (AV), a LiDAR point cloud and Simultaneous Localization and Mapping (SLAM) data associated with the stationary environmental feature in the mapped region while the AV is driving along one or more roadways in the mapped region;
    receive, from the AV, the LiDAR point cloud and the SLAM data;
    generate, based on a combination of the LiDAR point cloud and the SLAM data, second sensory data comprising second dimensional information and second position information of the stationary environmental feature in the mapped region;
    generate a plurality of IX node data points based on a combination of the first sensory data and the second sensory data, wherein the plurality of IX node data points comprises a first IX node data point associated with the first IX control device and a second IX node data point associated with the second IX control device;
    generate an optimized High-Definition (HD) map comprising the stationary environmental feature in the mapped region by smoothing the plurality of IX node data points using a batch optimization algorithm, wherein the batch optimization algorithm uses the first IX node data point as a first static IX control point and the second IX node data point as a second static IX control point; and
    navigate the AV along the one or more roadways in the mapped region using the optimized HD map.

9. The system according to claim 8, wherein the batch optimization algorithm reduces linearization error of the plurality of IX node data points to be less than a threshold for linearization error by smoothing the plurality of IX node data points without moving the first IX node data point or the second IX node data point relative to a remainder of the plurality of IX node data points.

10. The system according to claim 8, wherein the first IX control device is disposed in the mapped region at a first stationary position having a first known latitude and a first known longitude and the second IX control device is disposed at a second stationary position having a second known latitude and a second known longitude, and wherein a precision with which the stationary environmental feature is aligned on the optimized HD map is based on the first stationary position and the second stationary position in the mapped region.

11. The system according to claim 8, wherein the first sensory data is generated based on LiDAR sensory data collected by the first LiDAR system of the first IX control device and the second LiDAR system of the second IX control device.

12. The system according to claim 8, wherein the LiDAR point cloud comprises LiDAR sensory data and Inertial Measurement Unit (IMU) data.

13. The system according to claim 8, wherein the first sensory data and the LiDAR point cloud do not include Global Positioning System (GPS) data.

14. The system according to claim 8, wherein the first sensory data and the LiDAR point cloud do not include Real-Time-Kinematics (RTK) information.

15. A non-transitory computer-readable storage medium in a High-Definition (HD) mapping system, the computer-readable storage medium having instructions stored thereupon which, when executed by a processor, cause the processor to:

generate, by a first intersection (IX) control device comprising a first Light Detection and Ranging (LiDAR) system and a second IX control device comprising a second LiDAR system, first sensory data comprising first dimensional information and first position information of a stationary environmental feature in a mapped region;

receive, from the first IX control device and the second IX control device, the first sensory data;

collect, by one or more sensors disposed in an Autonomous Vehicle (AV), a LiDAR point cloud and Simultaneous Localization and Mapping (SLAM) data associated with the stationary environmental feature in the mapped region while the AV is driving along one or more roadways in the mapped region;

receive, from the AV, the LiDAR point cloud and the SLAM data;

generate, based on a combination of the LiDAR point cloud and the SLAM data, second sensory data comprising second dimensional information and second position information of the stationary environmental feature in the mapped region;

generate a plurality of IX node data points based on a combination of the first sensory data and the second sensory data, wherein the plurality of IX node data points comprises a first IX node data point associated with the first IX control device and a second IX node data point associated with the second IX control device;

generate an optimized HD map comprising the stationary environmental feature in the mapped region by smoothing the plurality of IX node data points using a batch optimization algorithm, wherein the batch optimization algorithm uses the first IX node data point as a first static IX control point and the second IX node data point as a second static IX control point; and navigate the AV along the one or more roadways in the mapped region using the optimized HD map.

16. The non-transitory computer-readable storage medium according to claim 15, wherein the batch optimization algorithm reduces linearization error of the plurality of IX nodes data points to be less than a threshold for linearization error by smoothing the plurality of IX node data points without moving the first IX node data point or the second IX node data point relative to a remainder of the plurality of IX node data points.

17. The non-transitory computer-readable storage medium according to claim 15, wherein the first IX control device is disposed in the mapped region at a first stationary position having a first known latitude and a first known longitude and the second IX control device is disposed at a second stationary position having a second known latitude and a second known longitude, and wherein a precision with which the stationary environmental feature is aligned on the optimized HD map is based on the first stationary position and the second stationary position in the mapped region.

* * * * *